United States Patent
Pedone

(10) Patent No.: US 7,039,719 B2
(45) Date of Patent: May 2, 2006

(54) DISTRIBUTED SYSTEM WITH AN EFFICIENT ATOMIC BROADCAST MECHANISM

(75) Inventor: Fernando Pedone, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 758 days.

(21) Appl. No.: 10/103,405

(22) Filed: Mar. 21, 2002

(65) Prior Publication Data
US 2003/0182444 A1    Sep. 25, 2003

(51) Int. Cl.
*G06F 15/173*    (2006.01)

(52) U.S. Cl. ...................................... 709/238

(58) Field of Classification Search .................. 714/16, 714/18, 50, 51, 12; 712/10, 28, 32; 379/87; 709/230, 201, 202, 203, 400, 238; 370/270; 718/100; 398/68
See application file for complete search history.

(56) References Cited

U.S. PATENT DOCUMENTS 5,799,146 A * 8/1998 Badovinatz et al. ........... 714/4
6,859,887 B1 * 2/2005 Frolund et al. ................ 714/4

* cited by examiner

*Primary Examiner*—Beatriz Prieto
*Assistant Examiner*—Cheryl Reid

(57) ABSTRACT

A method for ensuring consistent message reception among a plurality of nodes in a distributed system includes the step of causing nodes with outgoing messages to send the messages to all of the nodes. Each of the nodes then re-sends whatever messages it has received to all of the nodes after each of the nodes has received at least one message. The sequence of received messages in each of the nodes is then determined. If the sequence is not the same for all of the nodes, then each of the nodes re-sends what it has received until each node receives the same sequence of messages. A distributed system with a weak atomic broadcast module in each node to ensure consistent message reception while the nodes operate asynchronously is also described.

20 Claims, 10 Drawing Sheets

DISTRIBUTED SYSTEM WITH AN EFFICIENT ATOMIC BROADCAST MECHANISM

BACKGROUND OF THE INVENTION

1. Field of the Invention

The present invention pertains to communication in a distributed system. More particularly, this invention relates to a weak-atomic broadcast mechanism that ensures consistent message reception among various communication nodes in a distributed system.

2. Description of the Related Art

As is known, a distributed system may refer to a physical system that includes a number of independently-operated computer systems linked together by networks. The computer systems cooperate to provide a distributed computing environment. The computer systems communicate with each other during operations. One example of such a distributed system is a local area network. Another can be the Internet.

The distributed system may also refer to an application operated in such a distributed or federated computing environment as described above. In this case, the application typically includes a number of application components, processors, or agents running on the independently-operated computer systems. The application components also communicate with each other during operation.

Thus, it is apparent that a distributed system typically includes a number of nodes (or elements) that communicate with one another by sending messages among the nodes. FIG. 1 schematically illustrates a distributed system 10 that includes a number of nodes 11 through 12n. As can be seen from FIG. 1, the nodes 11–12n are connected together via a communication channel 13.

A distributed system can function synchronously, or asynchronously. A synchronously operated distributed system typically means that all of the nodes of the system function synchronously. An asynchronously operated distributed system basically makes no assumption as to the time it takes to transmit messages over network links and for nodes to perform their computations or operations.

Atomic broadcast is a known communication protocol that can be used for sending messages among nodes within a distributed system. The atomic broadcast protocol functions as follows. When a node has a message M to send, the sending node executes a broadcast (M) function (or primitive or procedure) to send the message. Then all of the nodes in the distributed system execute a deliver (M) function to receive the message M.

The atomic broadcast protocol is an important building block in distributed systems. The atomic broadcast protocol guarantees that if a message is broadcast to a group of nodes and one of these nodes receives the message (by executing the deliver function), then all of the nodes also receive the message (a property known as agreement). In addition, if two nodes receive the same two messages, they do so in the same order (a property known as total order). The atomic broadcast protocol has been used to build many fault-tolerant systems, such as highly-available databases.

However, the atomic broadcast mechanism cannot be implemented in a distributed system that functions in a pure asynchronous mode. This is due to the fact that the atomic broadcast protocol is subject to node (or processor) failures. A node failure typically occurs when messages broadcast are not received by all nodes in order, or not received at all. In addition, it is typically impossible to distinguish a very slow reacting node (i.e., a node that takes a long time to reply to other nodes) from a node that has failed in a pure asynchronous system. This means that a failure detection mechanism is needed if the atomic broadcast protocol is implemented for a purely asynchronously-operated distributed system.

Prior proposals have been made to provide the atomic broadcast protocol with some kind of failure detection mechanism. One such prior proposal extends the asynchronous model with failure detectors that are implemented with timeouts. But in order not strengthen the assumptions about the model "too much", i.e., making it less general, failure detectors are allowed to make mistakes. This makes the asynchronous model extended with failure detectors weaker than the synchronous model, but strong enough to allow the atomic broadcast protocol to be implemented.

This prior proposal, however, still bears disadvantages. One disadvantage is that even though protocols based on failure detectors can cope with incorrect node suspicions, their performance is negatively affected when suspicions are incorrect. Thus, in order to maximize performance, it is important to minimize incorrect suspicions. This is typically done by the use of large timeout values. This allows the system to distinguish a very slow reacting node (i.e., a node that takes a long time to reply) from a node that has failed. This, however, creates a dilemma since large timeout values lead to slow reaction in case of failures.

Thus, there exists a need for an atomic broadcast in an extended asynchronous model of computation that does not rely on failure detectors.

SUMMARY OF THE INVENTION

One feature of the present invention is to ensure consistent message reception among a number of nodes in a distributed system.

Another feature of the present invention is to ensure consistent message reception among a number of nodes in an asynchronously-operated distributed system.

In accordance with one embodiment of the present invention, a method for ensuring consistent message reception among a plurality of nodes in a distributed system includes a step of causing nodes with outgoing messages to send the messages to all of the nodes. Each of the nodes then re-sends whatever messages it has received to all of the nodes after each of the nodes has received at least a message. The sequence of received messages in each of the nodes is then determined. If the sequence is not the same for all of the nodes, then each node re-sends what it has received until each node receives the same sequence of messages. In doing so, consistent message reception is ensured while the nodes operate asynchronously.

In accordance with another embodiment of the present invention, a distributed system includes a communication channel for transferring messages. A number of nodes are coupled to the communication channel for sending and receiving messages to one another via the communication channel. A weak atomic broadcast module is located in each of the nodes to ensure consistent message reception among the nodes while the nodes operate asynchronously in sending and receiving the messages. The weak atomic broadcast module in each of the nodes re-sends what it has received until each node receives the same sequence of messages.

DETAILED DESCRIPTION OF THE INVENTION

Figure 1:
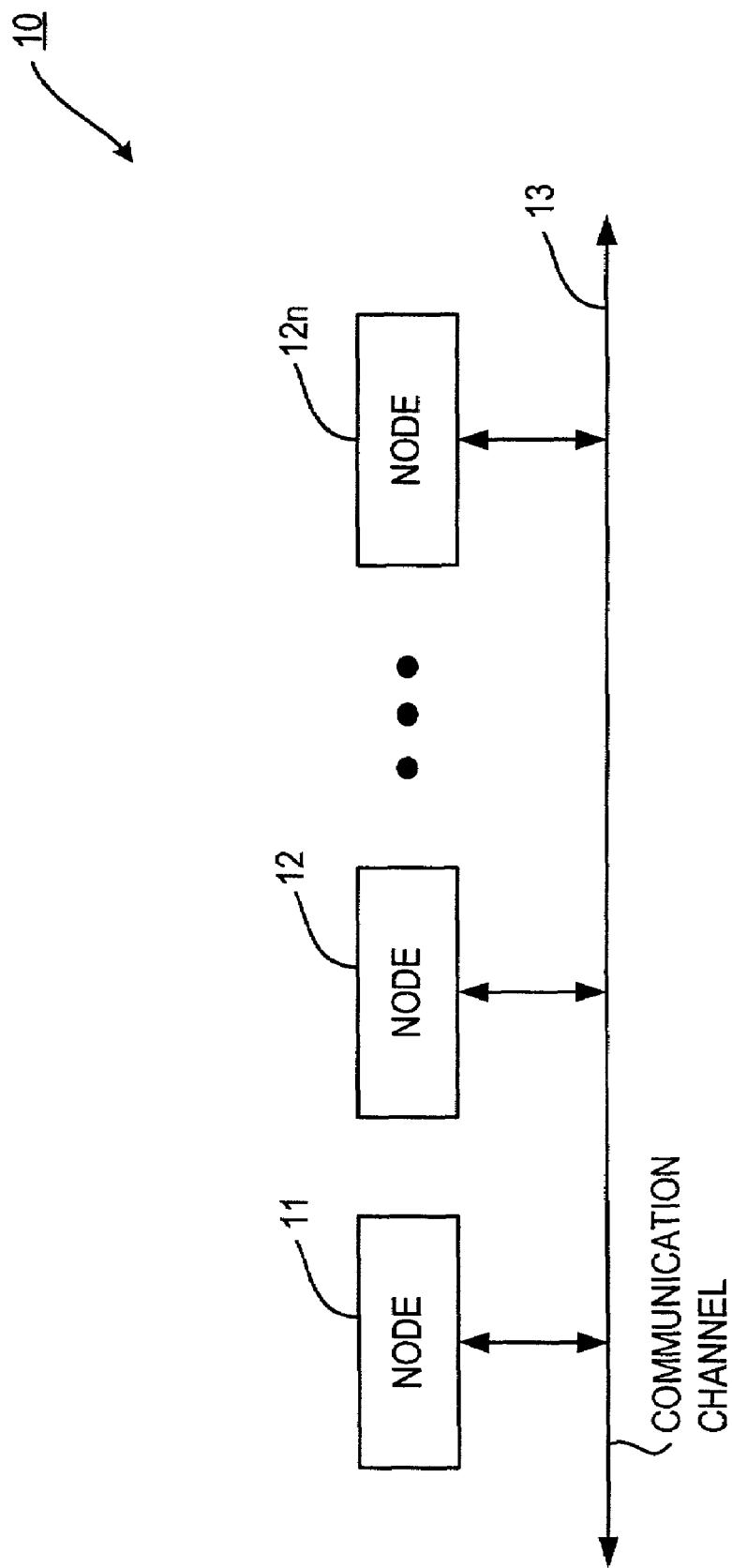
FIG. 1 shows a prior art distributed system.
Figure 2:
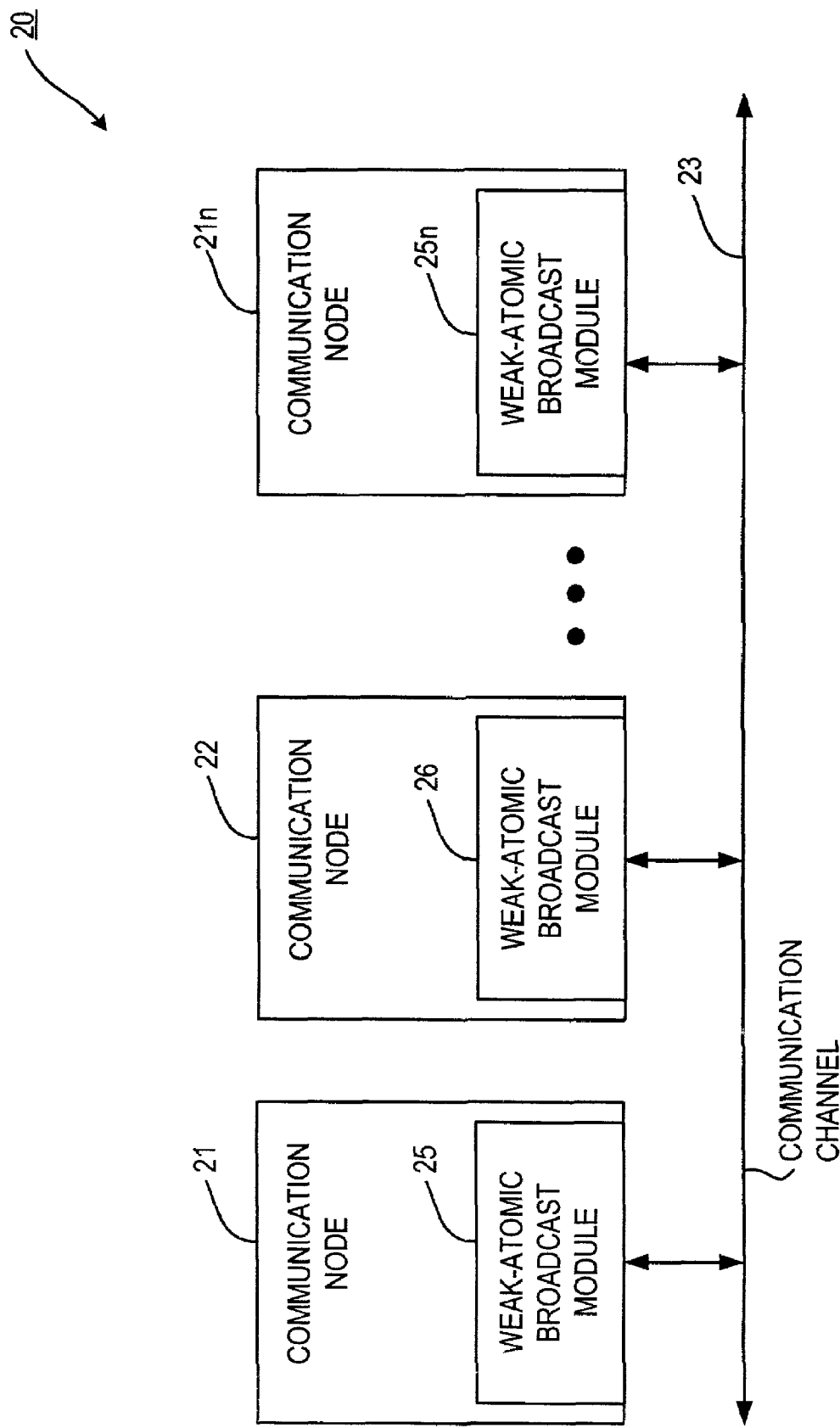
FIG. 2 shows a distributed system that implements one embodiment of the present invention, wherein the system includes a number of communication nodes, each employing a weak-atomic broadcast module to ensure consistent message reception.

FIG. 2 shows a distributed system 20 that includes a number of communication nodes 21 through 21n that communicate with each other via a communication channel 23. The distributed system 20 implements one embodiment of the present invention by including a weak-atomic broadcast module (e.g., the module 25, 26, or 25n) in each of the nodes 21–21n to ensure consistent message reception among the nodes 21–21n while the nodes 21–21n operate asynchronously and without failure detectors. This means that the weak-atomic broadcast module in each of the nodes 21–21n allows the asynchronously-operated distributed system 20 to employ the atomic broadcast protocol to transmit messages without relying on failure detectors. This ensures consistent message reception among the nodes 21–21n while not suffering from the failure detector dilemma. Since the weak-atomic broadcast module implemented in accordance with one embodiment of the present invention does not rely on failure detection, there is no timeout tuning involved in the execution of an atomic broadcast function, and therefore, failures can be handled very quickly.

As will be described in more detail below, the distributed system 20 operates asynchronously and the weak-atomic broadcast modules 25–25n in the nodes 21–21n are employed to send and receive messages for their corresponding nodes 21–21n. The weak atomic broadcast modules 25–25n prescribe how nodes 21–21n interact to order messages reliably, thus allowing the atomic broadcast protocol to be implemented in asynchronous system relying on quasi-reliable communication channels for communication and on weak ordering oracles. A weak ordering oracle models multicast primitives available in local area networks. It assumes that if nodes broadcast messages (e.g., using IP-multicast), some of these messages are received by all correct nodes in the same order. It allows messages to be received out of order and not to be received at all.

The operation of each of the weak atomic broadcast modules 25–25n in accordance with one embodiment of the present invention is now briefly described. First, when some of the nodes 21–21n have messages to send to other nodes, the weak atomic broadcast module in each of the nodes 21–21n propagates the sequence of broadcast messages to all of the nodes 21–21n via the channel 23. Then each of the nodes 21–21n waits for the first message to arrive. This is done by having its corresponding weak atomic broadcast module to execute a deliver function. The weak atomic broadcast module in each of the nodes 21–21n then sends whatever message it has received to all other nodes. Then each of the nodes 21–21n waits for n minus f messages to be received or delivered. Here, n represents the total number of nodes in the system 20 and f represents the number of failures the system 20 can tolerate. The weak atomic broadcast module in each of the nodes 21–21n then checks the sequence of the received messages to determine whether they are the same. If the sequence is not the same, the weak atomic broadcast module in each of the nodes 21–21n re-sends what it has received for its corresponding node until each node receives the same sequence of messages to ensure consistent message reception among the nodes 21–21n. The structure and operation of the weak-atomic broadcast modules 25–25n will be described in more detail below, also in conjunction with FIGS. 2 through 7.

As can be seen from FIG. 2, the distributed system 20 can be a physically distributed system (i.e., a number of independently-operated computer systems linked together by networks). The distributed system 20 can also be an application operated in a distributed or federated computing environment.

In one embodiment, the distributed system 20 is a physically distributed system. In this case, the distributed system 20 can be a local area network, a wide area network, a personal area network (PAN), or the Internet. In addition, each of the nodes 21–21n is a computer system or data processing system within the system.

In another embodiment, the distributed system 20 is an application having a number of application components (or processors or agents). The components may be running in a distributed or federated computing environment, or in a single computer system. This means that the components can be distributed or co-located. When the distributed system 20 is an application, each of the nodes 21–21n is a component, a processor, or an agent of the application. Alternatively, the distributed system 20 can be other types of distributed system.

The distributed system 20 operates asynchronously. This means that the distributed system 20 basically makes no assumption as to the time it takes to transmit messages over the communication channel 23 and for the nodes 21–21n to perform their operations. In other words, each of the nodes 21–21n operates independently and cannot estimate the time it takes for other nodes to execute their programs or to perform their operations.

In accordance with one embodiment of the present invention, the weak-atomic broadcast modules 25–25n implement a protocol that prescribe how the nodes 21–21n interact to order and deliver messages reliably without failure detectors. The weak-atomic broadcast modules 25–25n solve the atomic broadcast problem in an asynchronously operated distributed system by relying on a weak ordering oracle and on quasi-reliable channels. As described above, the atomic broadcast protocol is defined by the broadcast (m) and deliver (m) functions (or primitives) over a set of nodes or processors. Here, "m" represents the message to be broadcast or delivered. Broadcast (m) starts the broadcast, and a destination can safely use the message (m) once the deliver (m) function is executed. Throughout the entire description, a node that does not fail during the execution of the atomic broadcast protocol is referred to as correct and a node that is not correct is referred to as faulty.

The atomic broadcast protocol guarantees that if a correct node broadcasts a message m, then it eventually delivers m (validity property). In addition, if a node delivers m, then all of the correct nodes eventually deliver m (uniform agreement property). Moreover, every message is delivered at most once, and only if it was previously broadcast (uniform integrity property). If two nodes deliver messages m and m', they do so in the same order (uniform total order property).

The quasi-reliable channels are defined by send (m) and receive (m) functions, and the following properties:

(a) A node only receives a message if the message was sent to the node (i.e., no creation property).

(b) A node receives a message only once (i.e., no duplication property).

(c) If a node p sends a message m to another node q and nodes p and q are correct, q eventually receives m (no loss property).

A weak ordering oracle is defined by queries and outputs. To query a weak ordering oracle, a node executes a W-ABroadcast (r, m) function or primitive. Here, r is an integer that indicates round (or phase) of operation (or execution) and m indicates a message to be broadcast or delivered. In other words, the parameter r groups executions, and it relates executions issued by different nodes with the same r value. The W-ABroadcast (r, m) function is basically a multi-cast function or procedure. The W-ABroadcast (r, m) function can be abbreviated as WAB.

A node receives the output from an oracle by executing a W-ADeliver (m) function. Weak oracles model the following behavior that is common to local-area networks equipped with a built-in broadcast mechanism. The behavior is described as follows.

(1) there is a good chance that a broadcast message will be received in the same order by all nodes that do not crash;

(2) some messages can be received out of order and messages broadcast by nodes that crash are not received at all.

The behavior described above in (1) and (2) can be formally defined by the following properties:

(a) If a correct node executes the W-ABroadcast (r, m) function to send a message m, then all correct nodes eventually receive the message m (validity property).

(b) For every pair (r, m), the W-ABroadcast (r, m) function outputs at most once, and only if the W-ABroadcast (r, m) function was previously executed by some nodes (uniform integrity property).

(c) If all correct nodes execute an unbounded sequence of queries (i.e., W-ABroadcast (0, –), W-ABroadcast (1, –), W-ABroadcast (2, –), W-ABroadcast (3, –), . . . ), then there exists an unbounded number of values r such that for all of the nodes p and q that execute the W-ABroadcast (r, –) function for the first time, both the nodes p and q execute the W-ADeliver (r, m) function to receive the same message m (uniform order property).

Figure 3:
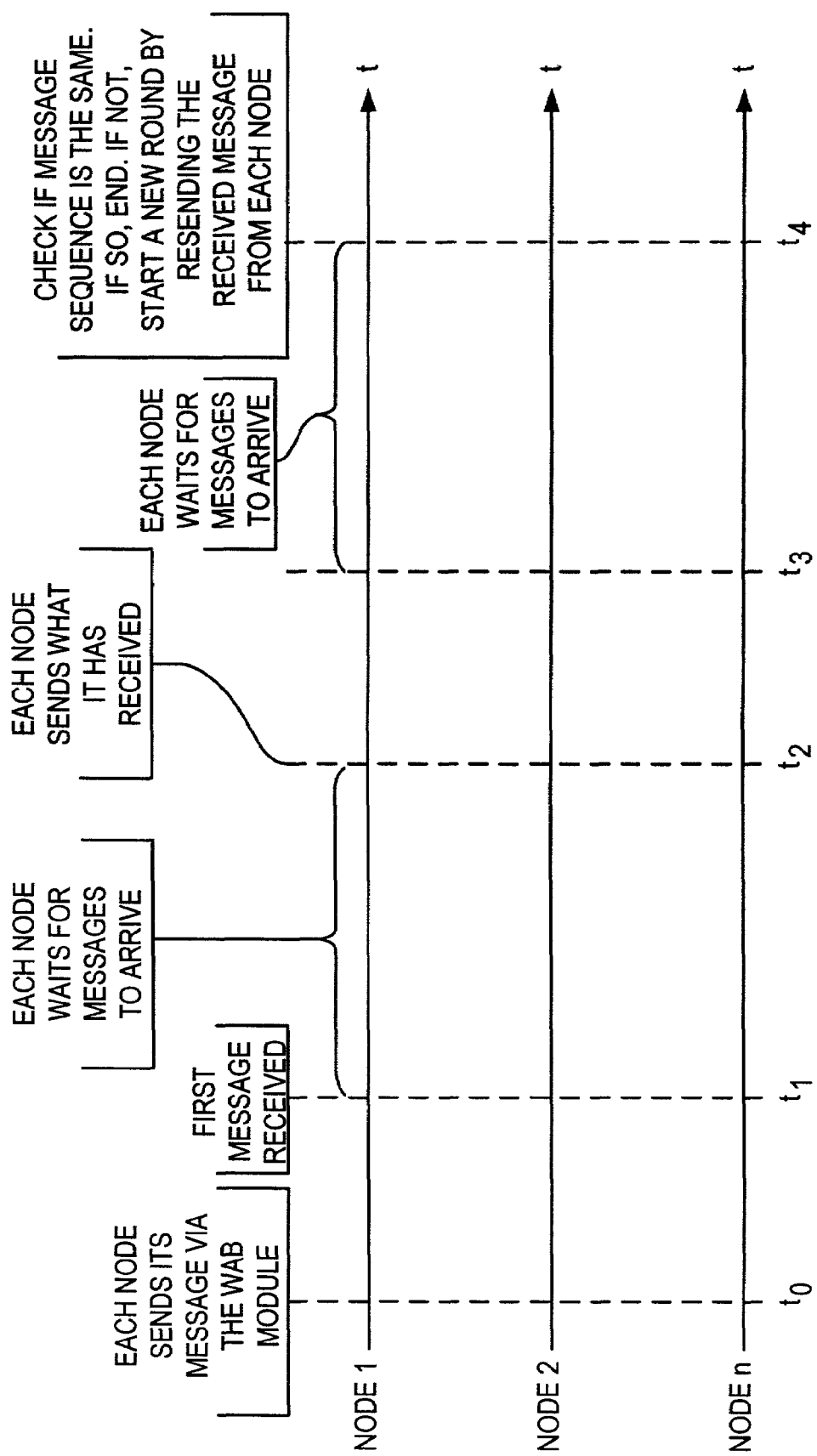
FIG. 3 illustrates in principle the operation of each of the weak-atomic broadcast modules of FIG. 2.

FIG. 3 illustrates in principle the operation of each of the weak-atomic broadcast modules 25–25n of FIG. 2. For simplicity of presentation we consider that all nodes perform similar operations at the same time (i.e., $t_0$–$t_4$). The invention, however, does not require the nodes to do so. As can be seen from FIGS. 2–3, at time to, each of the nodes 21–21n executes the W-ABroadcast (r, m) function to send whatever message it wants to send. If a node does not have any message to send, the W-ABroadcast function broadcasts an empty message (i.e., W-ABroadcast (r, $\epsilon$)).

At the time $t_1$, each of the nodes 21–21n executes a W-ADeliver (r, m) function to receive a first message. At this time, due to node failures, the first message received in each correct node of the nodes 21–21n may not be the same. To discover and correct the failures, each correct node of the nodes 21–21n sends whatever it has received to all other nodes at the time $t_2$. Then, each of the nodes 21–21n waits for messages to be delivered at the time $t_3$. At the time $t_4$, each of the nodes 21–21n then determines if the message sequence is the same in all of the correct ones of the nodes 21–21n. If so, no message delivery failures and the process ends. If not, a new round is initiated to repeat the process. At this time, whatever messages received in each node serve as the basic messages to be sent in the new round. This process is repeated until each of the correct nodes of the nodes 21–21n receives the same sequence of messages.

Figure 4A:
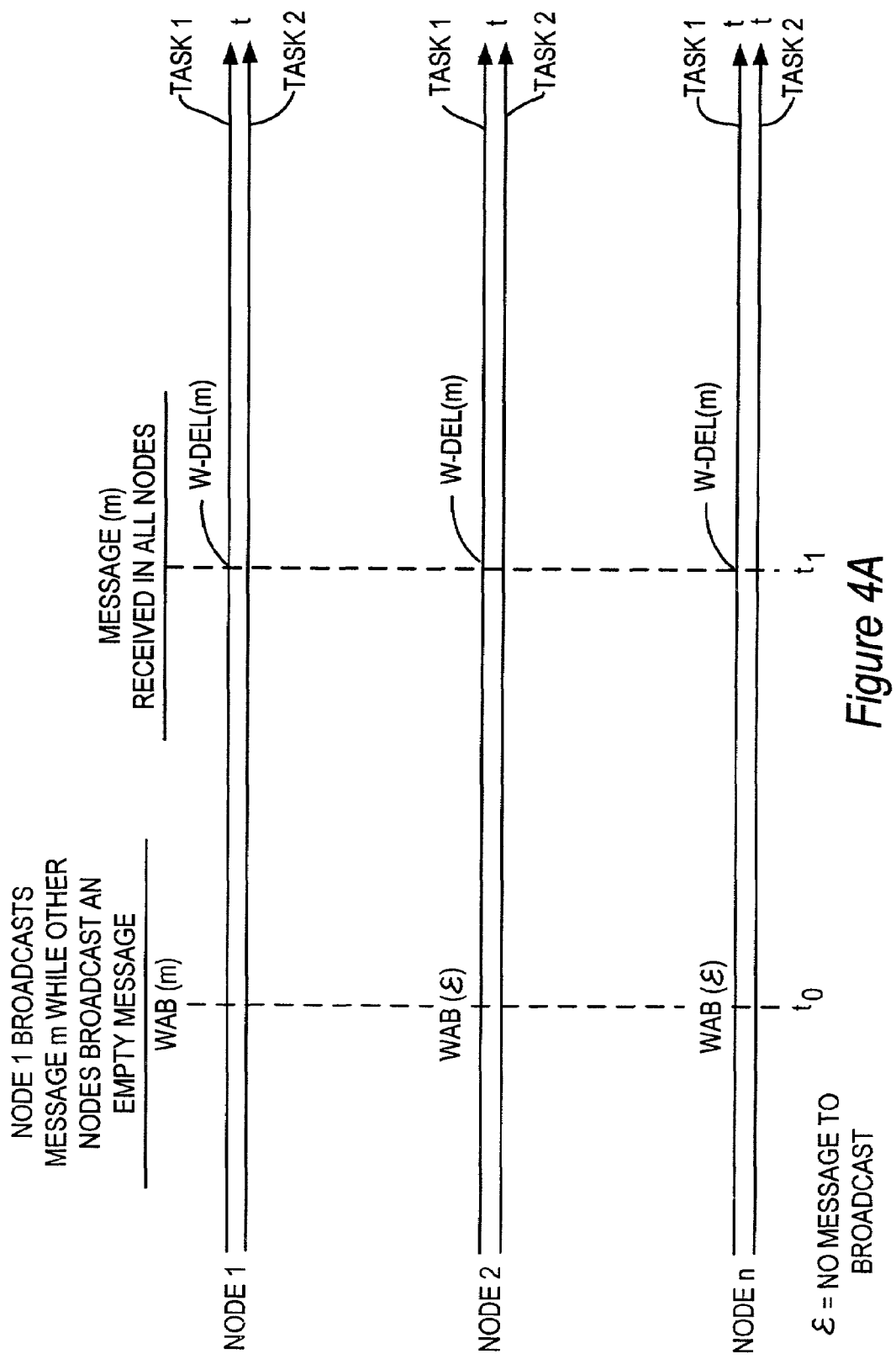
FIG. 4A shows the operation of each of the weak-atomic broadcast modules of FIG. 2 when the node 1 broadcasts a message (m).

FIGS. 4A shows, as an example, the operation of each of the weak-atomic broadcast modules 25–25n of FIG. 2 when the node 1 broadcasts a message (m). As can be seen from FIG. 4A, the weak-atomic broadcast module in each of the nodes 21–21n performs two tasks, TASK1 and TASK2. The first task TASK1 is to broadcast messages and to deliver the first received message. In addition, the first task TASK1 is to re-broadcast the first received message to all other nodes so that the sequence of the received messages in each of the nodes can be checked. The TASK2 is to deliver the second and any subsequent messages.

Figure 4B:
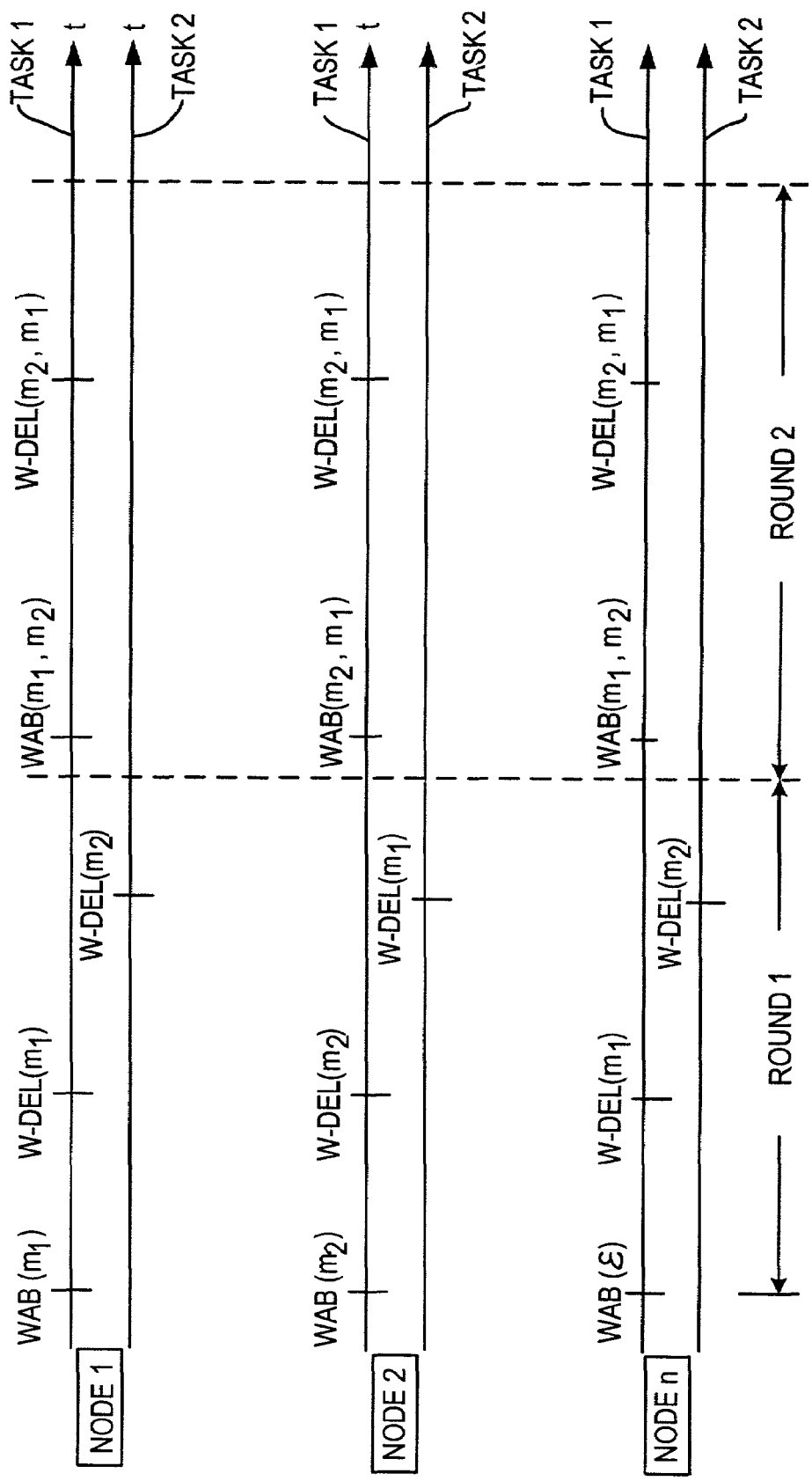
FIG. 4B shows the operation of each of the weak-atomic broadcast modules of FIG. 2 when the nodes 1 and 2 broadcast messages ($m_1$) and ($m_2$), respectively.

FIG. 4B shows the operation of each of the weak-atomic broadcast modules of FIG. 2 when the nodes 1 and 2 broadcast messages ($m_1$) and ($m_2$), respectively. As can be seen from FIG. 4B, when the nodes 1 and 3 are first delivered with the message ($m_1$) while the node 2 is first delivered with the message ($m_2$), a new round (i.e., round 2) is need to resend the messages of different sequences again. If, at round 2, there is no agreement as to the sequence of the received messages, then a further round (i.e., round 3) is needed. The process repeats itself until there is a single sequence of messages received in each of the nodes 21–21n.

Figure 5:
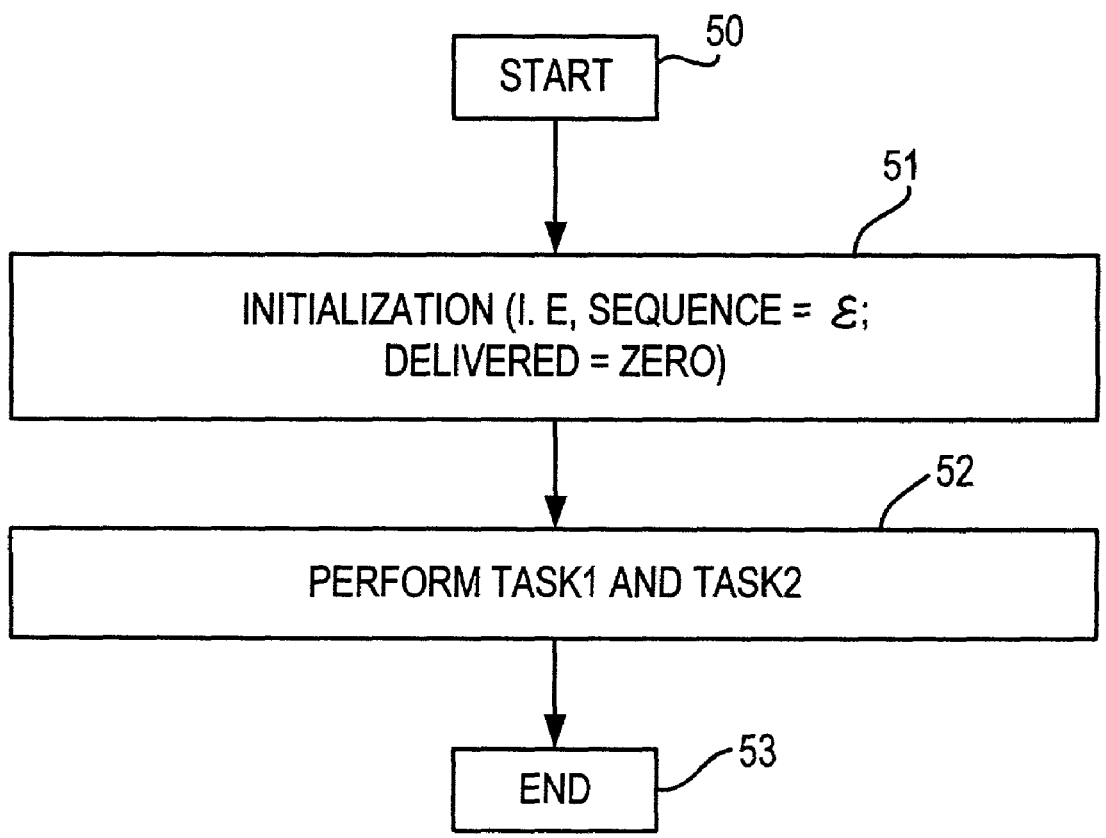
FIG. 5 illustrates in flowchart diagram form the main process of a weak-atomic broadcast module, wherein the process contains a TASK1 and a TASK2.

FIG. 5 shows in flowchart diagram form the main process performed by each of the weak-atomic broadcast modules 25–25n. As can be seen in FIG. 5, the process starts at the step 50. The step 51 is an initialization step, at which the ESTIMATE sequence is assigned an initial value of $\epsilon$(i.e., empty) and the DELIVERED sequence is assigned an initial value of empty sequence. The ESTIMATE sequence indicates the sequence of messages to be delivered by the corresponding node while the DELIVERED parameter indicates the sequence of messages that have been delivered locally. Thus, these two sequences are initially set at empty. At the step 52, weak-atomic broadcast module performs the TASK1 and TASK2. The process then ends at the step 53.

Figure 6A:
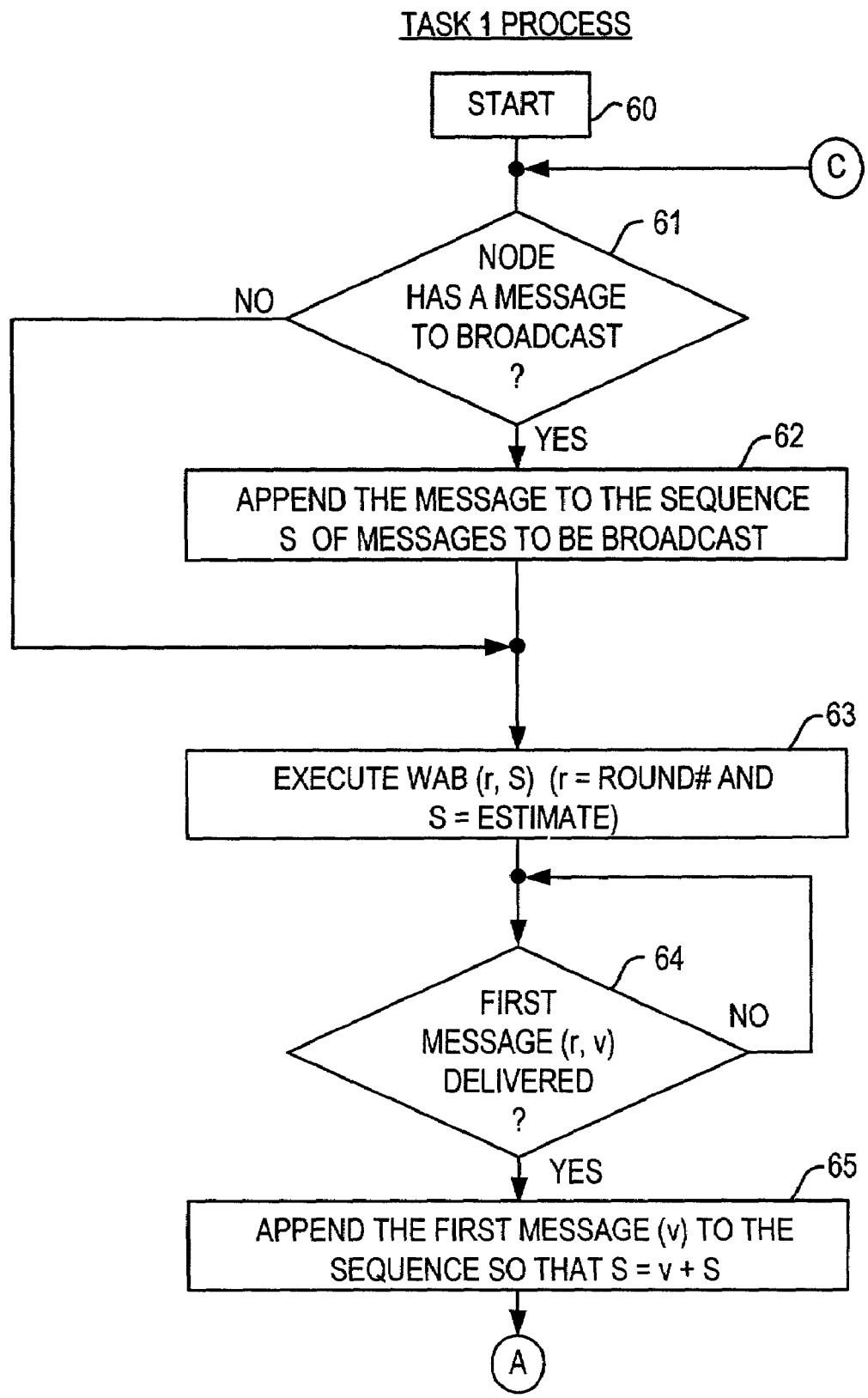
FIGS. 6A–6C show the process of the TASK1 of FIG. 5.
Figure 6B:
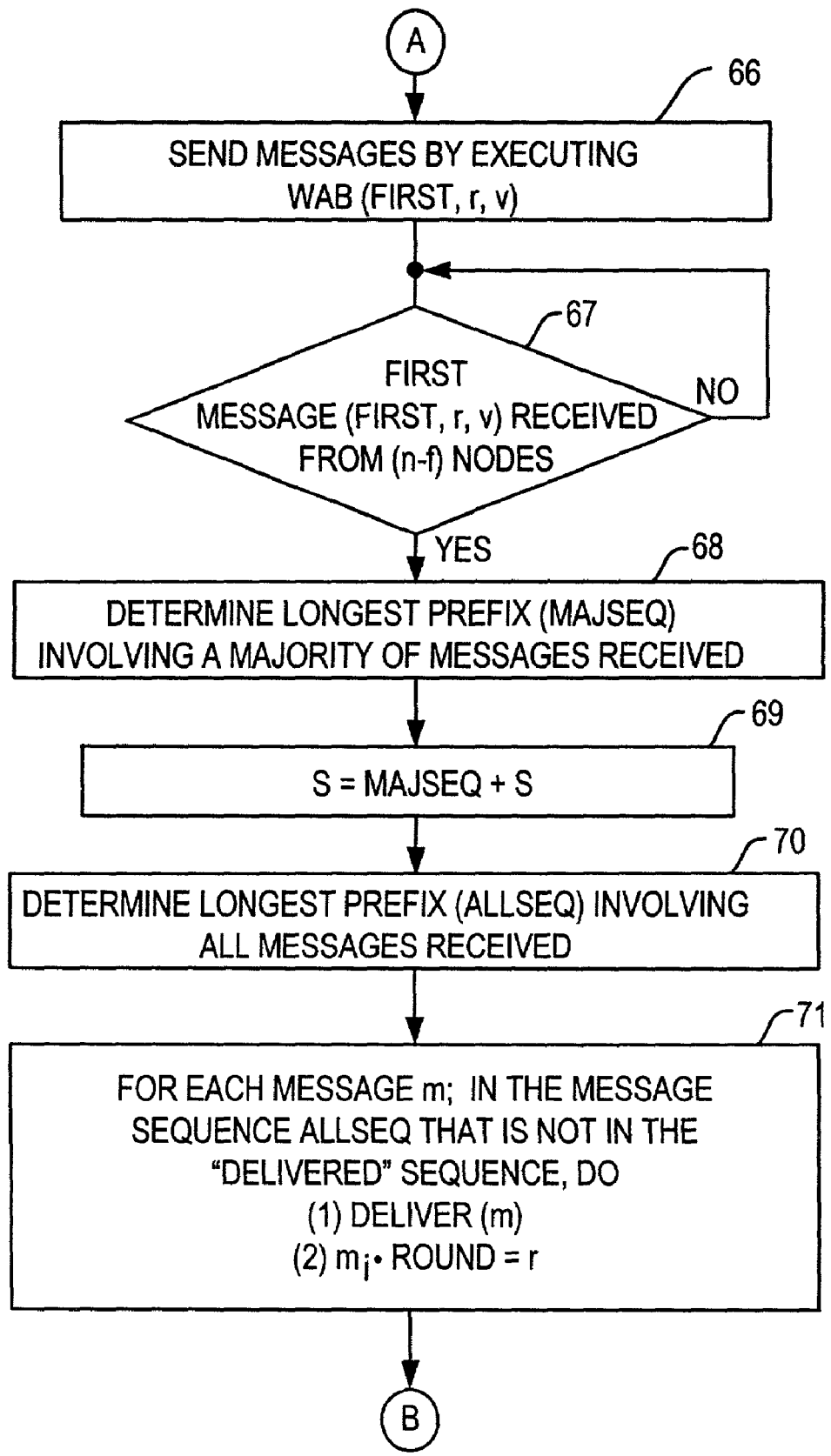
Figure 6C:
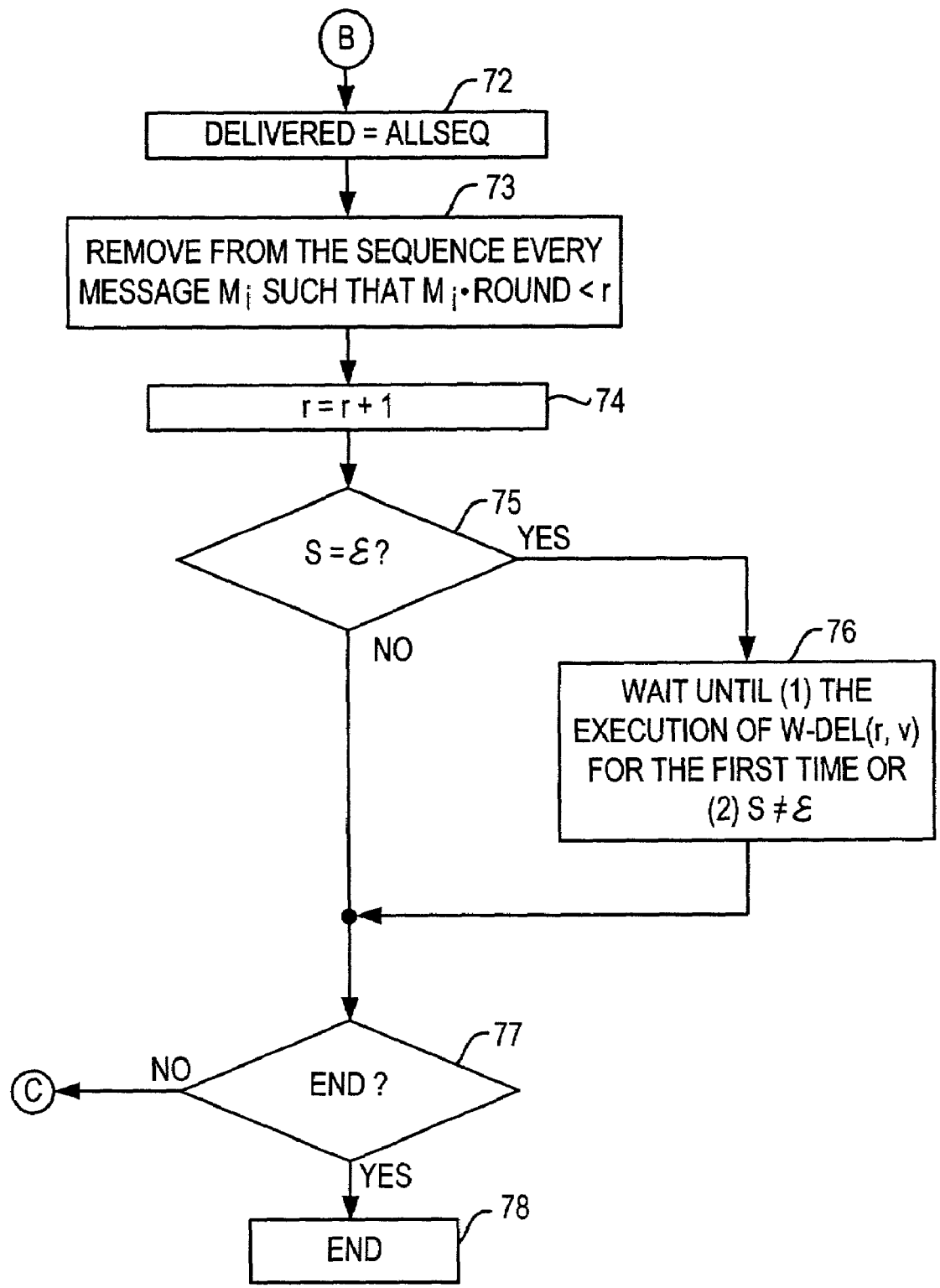

FIGS. 6A through 6C are flowchart diagrams, showing the process of the TASK1 referred to in FIG. 5. As can be seen from FIGS. 6A–6C, the process starts at the step 60. At the step 61, the weak-atomic broadcast module for a node waits for the corresponding node to send or broadcast a message. If not, the step 63 is the next step. If the answer is yes, then the step 62 is performed, at which the message is appended to a sequence of messages to be broadcast. A weak-atomic broadcast module in a node only removes a message m from its "ESTIMATE" sequence of messages to be delivered after the message m is actually delivered. To concatenate sequences, the operator "+" is used. For example, the message sequence of "$m_1$, $m_2$, $m_3$"+"$m_4$" means the sequence of "$m_1$, $m_2$, $m_3$, $m_4$". To remove messages from a sequence, the operator "\" is used. For example, "$m_1$, $m_2$, $m_3$"\"$m_1$, $m_3$,"="$m_2$". A prefix of two or more sequences is the longest sequence common to all such sequences. For the sequences of "$m_1$, $m_2$, $m_3$", "$m_1$, $m_2$, $m_3$, $m_4$", and "$m_1$, $m_2$, $m_3$, $m_4$, $m_5$", the prefix is "$m_1$, $m_2$, $m_3$".

Then the step 63 is executed, at which the W-ABroadcast (r, s) function is executed by the weak-atomic broadcast module in each of the nodes 21–21n of FIG. 2 to send or broadcast the messages that need to be delivered to all of the nodes 21–21*n*. Here, r indicates the current round of execution, as described above, while s indicates the value of the ESTIMATE sequence.

At the step 64, the weak-atomic broadcast module in each node waits for the first message v of the round to be delivered. If, for example, the node 21 of FIG. 2 that broadcasts a message m does not crash during the operation, then every node of the nodes 21–21*n* that executes the same round "r" eventually receives such a message (i.e., by executing the W-ADeliver function). The received message is referred to as "message (r, v)".

When that happens, the step 65 is performed, at which the first received message v is appended to the ESTIMATE sequence (i.e., s=v+s). Then the step 66 is performed, at which the weak-atomic broadcast module of each node proceeds to check whether the first received message (r, v) for round r is also the first message received by other nodes. This is done by sending or broadcasting the first-received message (r, v) to all other nodes by executing a W-ABroadcast (first, r, v) function, and waits for a similar message from n-f number of nodes. As described above, n represents the total number of nodes 21–21*n* and f represents the total number of failures the system can tolerate.

The step 67 is then performed, at which it is determined whether the message (first, r, v) from n-f number of nodes is received. If so, the sequences "MAJSEQ" and "ALLSEQ" are built at the steps 68–70. The sequence "MAJSEQ" indicates a sequence of messages that are the longest common prefix involving majority of the messages received. The sequence "ALLSEQ" indicates a sequence of messages that are the longest common prefix involving all of the messages received. The sequences "MAJSEQ" and "ALLSEQ" are used to determine if the messages received in each node are consistent.

At the step 68, the sequence "MAJSEQ" is built. At the step 69, the sequence "MAJSEQ" is added to the "ESTIMATE" sequence (i.e., s=MAJSEQ+s). Then the step 70 is performed, at which the sequence "ALLSEQ" is built.

The steps 71–73 allow the weak-atomic broadcast module of a node to deliver each message in the "ALLSEQ" sequence that it has not delivered yet and update the round in which the message is delivered (i.e., the step 71). Each message has a field (i.e., "round") that stores the round in which the message was delivered. The weak-atomic broadcast module then updates the "ESTIMATE" sequence with the messages it has just delivered at the step 72. Messages are removed from the "ESTIMATE" sequence if they were delivered in the previous round (i.e., the step 73). Messages delivered in the current round are kept in the "ESTIMATE" sequence to make sure that all nodes will deliver the message, which is only certain to happen in the next round.

Then the weak-atomic module advances one round by incrementing the round number r (i.e., r=r+1) at the step 74. At the step 75, the "ESTIMATE" sequence is checked to determine if it is empty (i.e., =ϵ). If the sequence is empty, then the step 76 is performed, at which the weak-atomic broadcast module waits until (1) the execution of the W-ADeliver (r, v) function for the first time to deliver some messages, or (2) the "ESTIMATE" sequence is not empty (i.e., some message is included in the "ESTIMATE" sequence. While a node is waiting, a message can be included into the "ESTIMATE" sequence by the TASK2, which will be described in more detail below, along with FIG. 7.

If, however, the answer is no at the step 75, then the step 77 is performed to determine if end is desired. If not, the step 61 is the next step. If so, the step 78 is the next step.

Figure 7:
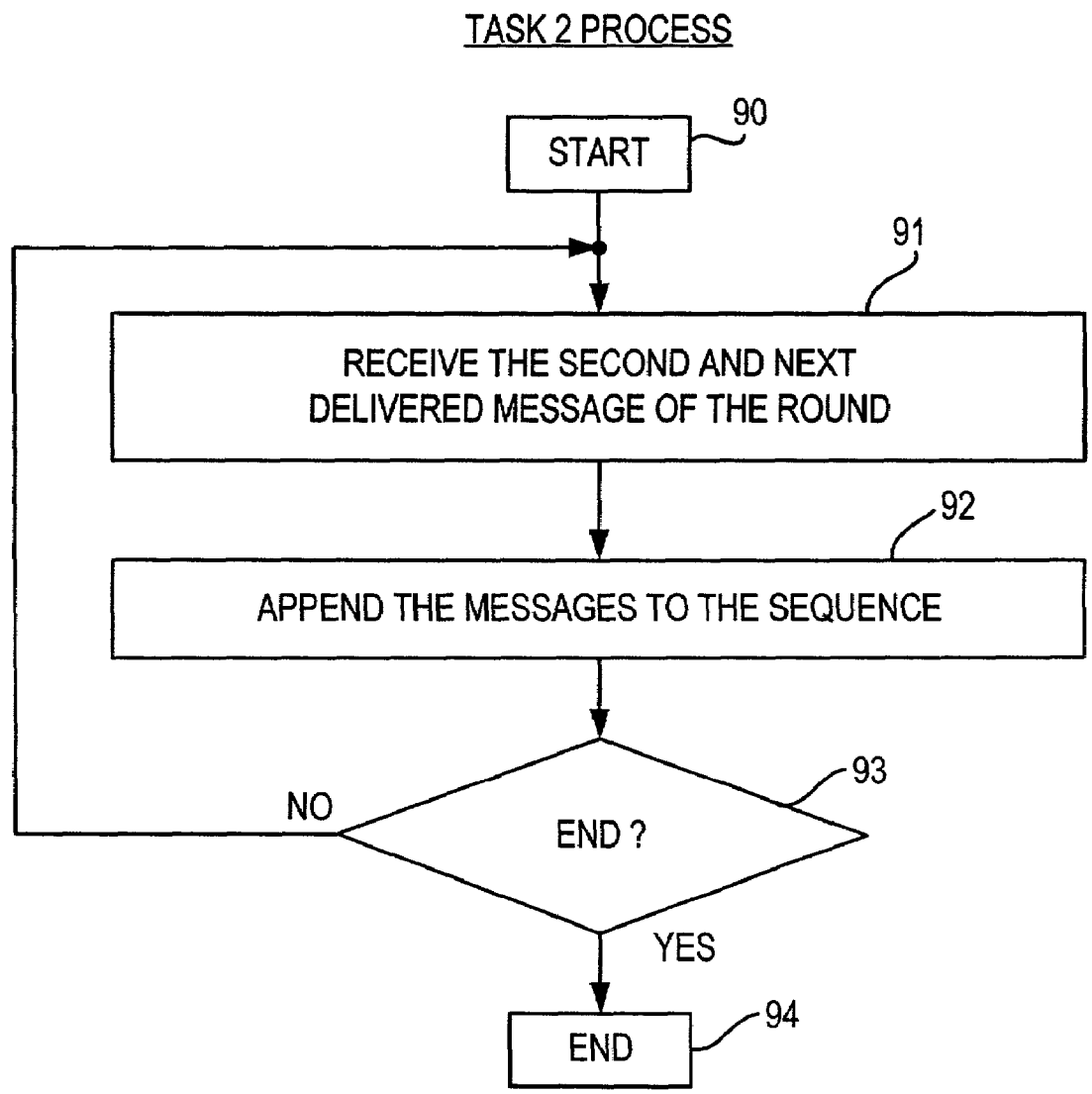
FIG. 7 shows the process of the TASK2 of FIG. 5.

FIG. 7 is a flowchart diagram, showing the process of the TASK2 referred to in FIG. 5. As can be seen from FIG. 7, at the step 91, the weak-atomic broadcast module receives the second and next delivered messages of the current round r. This is done by executing a W-ADeliver (r,v) function. At the step 92, the messages are appended to the "ESTIMATE" sequence (i.e., s=s+v).

As described above, a message m included in the "ESTIMATE" sequence by a node that does not crash is delivered as soon as the order property of the weak ordering oracle holds.

Then the step 93 is performed to determine if the task is to end or not. If so, the process ends at the step 94. If not, the process returns to the step 91.

In the foregoing specification, the invention has been described with reference to specific embodiments thereof. The specification and drawings should, however, be regarded in an illustrative rather than a restrictive sense.

What is claimed is:

1. A method for ensuring consistent message reception among a plurality of nodes in a distributed system, comprising:
   causing nodes with outgoing messages to send the messages to all of the nodes;
   causing each of the nodes to re-send whatever messages it has received to all the nodes after each of the nodes has received at least a message;
   determining if sequencing of received messages in each of the nodes is the same;
   if the sequence is not the same for all the nodes, then causing each of the nodes to re-send what it has received until each node receives the same sequence of messages so as to allow consistent message reception while the nodes operate asynchronously.

2. The method of claim 1, further comprising the step of waiting for a predetermined number of messages to be received in each of to nodes before the step of determining if the sequence of received messages in each of the nodes is the same.

3. The method of claim 2, wherein the predetermined number of messages is set at the total number of nodes of the distributed system minus the total number of node failures the distributed system can tolerate.

4. The method of claim 1, wherein the step of causing nodes with outgoing messages to send the messages to all of to nodes is performed by
   causing each of the nodes to execute a broadcast function to send the messages;
   causing each of the nodes to execute a deliver function to receive the messages.

5. The method of claim 1, further comprising the step of causing each of the nodes to stop re-sending what it has received if the sequence of received messages is the same in each of the nodes.

6. The method of claim 1, wherein the distributed system is a network system and each of the nodes is a computer system.

7. The method of claim 1, wherein the distributed system is an application and the nodes are application components, processors, or agents of the application.

8. A distributed system, comprising:
   a communication channel for transferring messages;
   a plurality of nodes coupled to the communication channel for sending and receiving messages to one another via the communication channel;
   a weak atomic broadcast module in each of the nodes to ensure consistent message reception among the nodes while the nodes operate asynchronously in sending and receiving the messages, wherein the weak atomic broadcast module in each of the nodes re-sends what it has received until each node receives the same sequence of messages.

9. The distributed system of claim 8, wherein the weak atomic broadcast module ensures consistent message reception among the nodes by sending the messages from those of the nodes that have messages to send to all of the nodes;

re-sending whatever messages each of the nodes has received to all the nodes after the weak atomic broadcast module in each of the nodes has received at least a message;

determining if the sequence of received messages in each of the nodes is the same;

if the sequence is not to same for all the nodes, then re-sending whatever messages each of the nodes has received until each node receives the same sequence of messages so as to allow consistent message reception while the nodes operate asynchronously.

10. The distributed system of claim 9, wherein the weak atomic broadcast module in each of the nodes waits for a predetermined number of messages to be received in each of the nodes before determining if the sequence of received messages in each of the nodes is the same.

11. The distributed system of claim 10, wherein the predetermined number of messages is set at the total number of nodes of the distributed system minus the total number of node failures the distributed system can tolerate.

12. The distributed system of claim 8, wherein the distributed system is a network system and each of the nodes is a computer system.

13. The distributed system of claim 8, wherein the distributed system is an application and the nodes are application components, processors, or agents of the application.

14. An apparatus, comprising:

a storage medium;

a software program stored on the storage medium to ensure, when executed, consistent message reception among a plurality of nodes, wherein the software program further comprises a first set of instructions that cause the nodes to send the messages to all of the nodes;

a second set of instructions that cause each of the nodes to re-send whatever messages it has received to all of the nodes after each of the nodes has received a message;

a third set of instructions that determine if the sequence of received messages in each of the nodes is the same;

a fourth set of instructions that cause each of the nodes to re-send what it has received until each node receives the same sequence of messages if the sequence is not the same in all of the nodes.

15. The apparatus of claim 14, wherein the software further comprises a fifth set of instructions that cause each of the nodes to wait for a predetermined number of messages to be received in each of the nodes before the third set of instructions determine if the sequence of received messages in each of the nodes is the same.

16. The apparatus of claim 15, wherein the predetermined number of messages is set at the total number of nodes of the distributed system minus the total number of node failures the distributed system can tolerate.

17. The apparatus of claim 14, wherein the first set of instructions that cause the nodes to send the messages to all of the nodes further comprise a first subset of instructions that cause each of the nodes to execute a broadcast function to send the messages;

a second subset of instructions that cause each of the nodes to execute a deliver function to receive the messages.

18. The apparatus of claim 14, further comprising a sixth set of instructions that cause each of the nodes to stop re-sending what it has received if the sequence of received massages is the same in each of the nodes.

19. The apparatus of claim 14, wherein each of the nodes is a computer system.

20. The apparatus of claim 14, wherein the nodes are application components, processors, or agents of the application.

* * * * *

UNITED STATES PATENT AND TRADEMARK OFFICE
CERTIFICATE OF CORRECTION

PATENT NO. : 7,039,719 B2  Page 1 of 1
APPLICATION NO. : 10/103405
DATED : May 2, 2006
INVENTOR(S) : Fernando Pedone It is certified that error appears in the above-identified patent and that said Letters Patent is hereby corrected as shown below:

In column 5, line 54, delete "to" and insert -- $t_0$ --, therefor.

In column 8, line 37, in Claim 2, after "each of" delete "to" and insert -- the --, therefor.

In column 8, line 46, in Claim 4, delete "to" before "nodes" and insert -- the --, therefor.

In column 9, line 17, in Claim 9, after "not" delete "to" and insert -- the --, therefor.

In column 10, line 35, in Claim 18, delete "massages" and insert -- messages --, therefor.

Signed and Sealed this

Thirtieth Day of March, 2010

David J. Kappos
*Director of the United States Patent and Trademark Office*